United States Patent [19]
Bartfai et al.

[11] Patent Number: 6,067,567
[45] Date of Patent: May 23, 2000

[54] MESSAGE DISTRIBUTION CAPABILITY WHICH USES DISTRIBUTION NODES TO COLLECT ACKNOWLEDGEMENTS FOR A PRIMARY NODE

[75] Inventors: Robert Francis Bartfai, West Shokan; John Divirgilio, Middletown; John William Doxtader, Hurley; Laura Jean Merritt, Wappingers Falls; Kevin John Reilly, Mohopac, all of N.Y.

[73] Assignee: International Business Machines Corporation, Armonk, N.Y.

[21] Appl. No.: 08/803,473

[22] Filed: Feb. 20, 1997

[51] Int. Cl.⁷ .......................... G06F 15/177; G06F 15/16; G06F 15/173
[52] U.S. Cl. ........................... 709/221; 709/242; 709/237
[58] Field of Search ................... 395/200.55, 200.67, 395/200.51, 200.72, 200.76; 709/225, 237, 221, 242, 246

[56] References Cited

U.S. PATENT DOCUMENTS

| | | | |
|---|---|---|---|
| 5,036,518 | 7/1991 | Tseung | 371/32 |
| 5,056,085 | 10/1991 | Vu | 370/60 |
| 5,079,767 | 1/1992 | Perlman | 370/94.3 |
| 5,117,420 | 5/1992 | Hillis et al. | 370/60 |
| 5,138,615 | 8/1992 | Lamport et al. | 370/94.3 |
| 5,166,674 | 11/1992 | Baum et al. | 340/825.07 |
| 5,295,154 | 3/1994 | Meier et al. | 375/1 |
| 5,309,433 | 5/1994 | Cidon et al. | 370/60 |
| 5,355,371 | 10/1994 | Auerbach et al. | 370/60 |
| 5,541,927 | 7/1996 | Kristol et al. | 370/408 |
| 5,572,678 | 11/1996 | Homma et al. | 395/200.57 |
| 5,574,860 | 11/1996 | Perlman | 395/200.06 |
| 5,630,184 | 5/1997 | Roper et al. | 395/200.1 |
| 5,634,011 | 5/1997 | Auerbach et al. | 395/200.15 |
| 5,727,002 | 3/1998 | Miller et al. | 371/32 |
| 5,790,772 | 8/1998 | Badovinatz et al. | 395/182.02 |

FOREIGN PATENT DOCUMENTS

| | | | |
|---|---|---|---|
| 6284142 | 10/1994 | Japan | 12/44 |
| 6318950 | 11/1994 | Japan | 12/44 |

OTHER PUBLICATIONS

"Scoping Multicasts In Wan–Interconnected Local Networks," IBM Technical Bulletin, vol. 34, No. 8, pp. 68–71 (Jan. 1992).

"Distributed Tree Maintenance," IBM Technical Bulletin, vol. 35, No. 1A, pp. 93–98 (Jun. 1992).

*Primary Examiner*—Stuart S. Levy
*Assistant Examiner*—Kenneth W Fields
*Attorney, Agent, or Firm*—Floyd A. Gonzalez, Esq.; Heslin & Rothenberg, P.C.

[57] ABSTRACT

Messages are sent from a primary node of a computer system to one or more distribution nodes of the system. Each of the distribution nodes then further sends the message to one or more other nodes of the computer system. After receipt of the message, the other nodes forward an acknowledgement to the particular distribution node, which sent the message. The distribution nodes collect their respective acknowledgements, and when all of the expected acknowledgements are received by a distribution node, the distribution node sends one acknowledgement to the primary node. The one acknowledgement indicates receipt of the message by the other nodes.

35 Claims, 4 Drawing Sheets

MESSAGE DISTRIBUTION CAPABILITY WHICH USES DISTRIBUTION NODES TO COLLECT ACKNOWLEDGEMENTS FOR A PRIMARY NODE

TECHNICAL FIELD

This invention relates, in general, to distributing messages in a computer system and, in particular, to using distribution nodes of the computer system to collect acknowledgements of a message originated by a primary node.

BACKGROUND ART

Many techniques are known for distributing messages within a computer system. As one example, one node designated as a primary node typically commences a broadcast to send a message to other nodes of the system. The message is serially sent from one node to another and so on until all of the nodes of the system have received the message. As the nodes receive the message, they send acknowledgements back to the primary node indicating receipt of the message. That is, each node that receives the message forwards an acknowledgement back to the primary node.

In very large computer systems, the return of the acknowledgements back to the primary node can be problematic. For instance, if the primary node receives too many acknowledgements at one time, then some of the acknowledgements may be missed or dropped leading to the unreliable distribution of messages.

Thus, a need exists for a message distribution technique, which is reliable and verifiable. A need also exists for a technique that does not require that all of the acknowledgements be passed back to the primary node. A need further exists for an implementation that allows intermediate nodes to relieve some of the burden of the primary node.

SUMMARY OF THE INVENTION

The shortcomings of the prior art are overcome and additional advantages are provided through the provision of a message distribution method for a computer system. A primary node of the computer system determines a valid distribution node of the system. The primary node then sends a message to the valid distribution node. The distribution node then sends the message to a plurality of nodes of the computer system. The distribution node collects indications of receipt of the message from the plurality of nodes and then, forwards one acknowledgement from the distribution node to the primary node. The one acknowledgement indicates receipt of the indications from the plurality of nodes.

In another embodiment of the valid present invention, a number of acknowledgements are forwarded from the distribution node to the primary node. The number of acknowledgements is less than the number of indications received by the distribution node from the plurality of nodes; however, the number of acknowledgements indicates receipt of the message by the plurality of nodes.

In yet another embodiment of the present invention, a message distribution method for a computer system is provided, in which a primary node of the computer system determines a valid distribution node of the system; sends a message the valid distribution node; the message is sent from the distribution node to a plurality of nodes of the computer system; the distribution node collects messages from the plurality of nodes, in which the messages correspond to the message received from the distribution node; and the distribution node forwards one communication from the distribution node to the primary node. The one communication indicates a condition specified by the messages of the plurality of nodes collected by the distribution node.

In still another embodiment of the present invention, the forwarding includes forwarding a number of communications from the valid distribution node to the primary node. The number of communications is less than the number of messages received by the distribution node from the plurality of nodes; however, the number of communications indicates the condition specified by the messages of the plurality of nodes.

In yet another aspect of the present invention, an article of manufacture is provided, which includes a computer useable medium having computer readable program code means embodied therein for use in distributing messages. The computer readable program code means in the article of manufacture includes computer readable program code means for causing a computer to effect determining, by a primary node of the computer system, a valid distribution node of the computer system; computer readable program code means for causing a computer to effect sending, by the primary node, a message to the valid distribution node; computer readable program code means for causing a computer to effect sending the message from the distribution node to a plurality of nodes of the computer system; computer readable program code means for causing a computer to effect collecting, by the distribution node, indications of receipt of the message from the plurality of nodes; and computer readable program code means for causing a computer to effect forwarding one acknowledgement from the distribution node to the primary node. The one acknowledgement indicates receipt of the message by the plurality of nodes.

In yet another embodiment of the present invention, an article of manufacture is provided. The article of manufacture includes a computer useable medium having computer readable program code means embodied therein for use in distributing messages. The computer readable program code means in the article of manufacture includes computer readable program code means for causing a computer to effect determining, by a primary node of the computer system, a valid distribution node of the computer system; computer readable program code means for causing a computer to effect sending, by the primary node, a message to the valid distribution node; computer readable program code means for causing a computer to effect sending the message from the distribution node to a plurality of nodes of the computer system; computer readable program code means for causing a computer to effect collecting, by the distribution node, messages from the plurality of nodes, in which the messages correspond to the message received from the distribution node; and computer readable program code means for causing a computer to effect forwarding one communication from the distribution node to the primary node. The one communication indicating a condition specified by the messages of the plurality of nodes collected by the distribution node.

The message distribution capability of the present invention advantageously relieves the primary node from the responsibility of collecting acknowledgements from all of the nodes that received the message originated by the primary node. The present invention provides a reliable and verifiable message distribution mechanism, which enables each valid distribution node within the computer system to collect acknowledgements from those nodes that received the message from the particular distribution node, and then to forward from each distribution node only one acknowledgement to the primary node. This removes a great burden from the primary node and ensures a more reliable message distribution technique.

Additional features and advantages are realized through the techniques of the present invention. Other embodiments and aspects of the invention are described in detail herein and are considered a part of the claimed invention.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention will be apparent from the following detailed description taken in conjunction with the accompanying drawings in which:

BEST MODE FOR CARRYING OUT THE INVENTION

Figure 1:
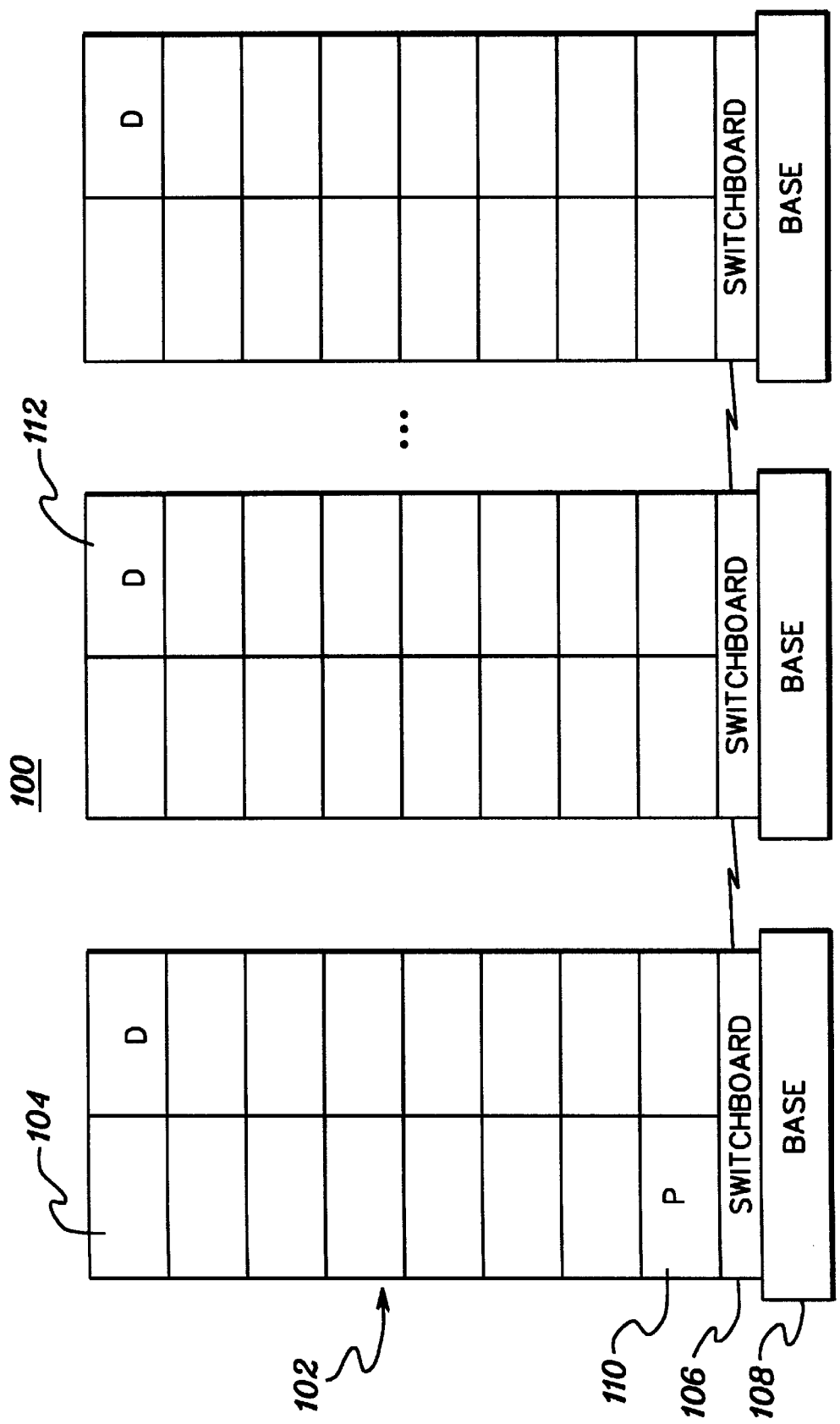
FIG. 1 depicts one example of a computer system incorporating and using the message distribution capability of the present invention.

In accordance with the principles of the present invention, a message distribution capability is provided in which distribution nodes of a computer system are used to collect acknowledgements for a primary node of the system. One example of a computer system incorporating and using the message distribution capability of the present invention is depicted in FIG. 1 and described in detail below.

In one example, a computer system 100 includes a plurality of frames 102, in which each frame 102 includes a plurality of nodes 104. In one example, each frame includes sixteen (16) nodes and each node includes one or more central processing units. As one instance, each node is an RS/6000 computer offered by International Business Machines Corporation.

Frame 102 also includes a switchboard, such as an SP Switch offered by International Business Machines Corporation, which connects all of the nodes of the frame to one another, as well as connects one frame to one or more other frames. In one embodiment, the switchboard has 32 connections allowing for the connections of the 16 nodes, as well as connections to 16 other switchboards. The use of the connections in this manner is only one example. Other variations are possible without departing from the spirit of the present invention. For instance, more or less of the connections can be used for nodes, and likewise more or less of the connections can be used for connections to other switchboards.

Each of the frames further includes a base, which supplies, for instance, power to each of the nodes within the frame.

Figure 2:
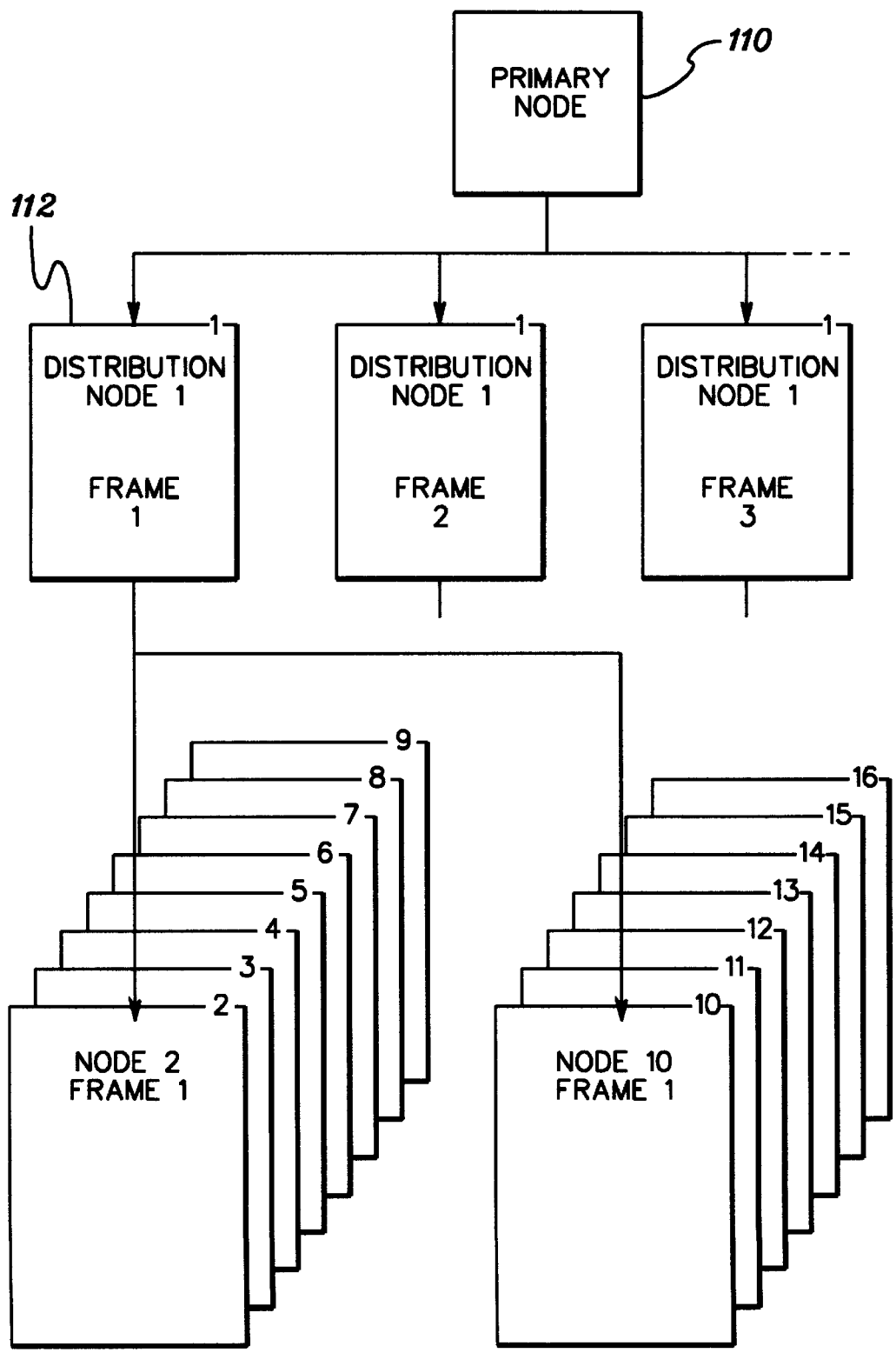
FIG. 2 depicts one example of a tree structure, in accordance with the principles of the present invention.

In accordance with the principles of the present invention, one node within computer system 100 is designated as a primary node 110 for the system. The primary node has the responsibility of originating the distribution of a message to all of the valid nodes of the computer system. In particular, the primary node designates one node in each frame as a distribution node 112, and the primary node sends (e.g., broadcasts) the message to the distribution nodes. (See FIG. 2) Each distribution node then sends (e.g., broadcasts) the message to the remaining nodes of its frame.

In accordance with the present invention, each distribution node collects acknowledgements from the valid nodes of its frame and when all the expected acknowledgements are received from the nodes within its frame, the distribution node sends one acknowledgement back to the primary node. Thus, the primary node receives only one acknowledgement from each frame instead of 16 acknowledgements from the frame (i.e., one for each node).

Figure 3A:
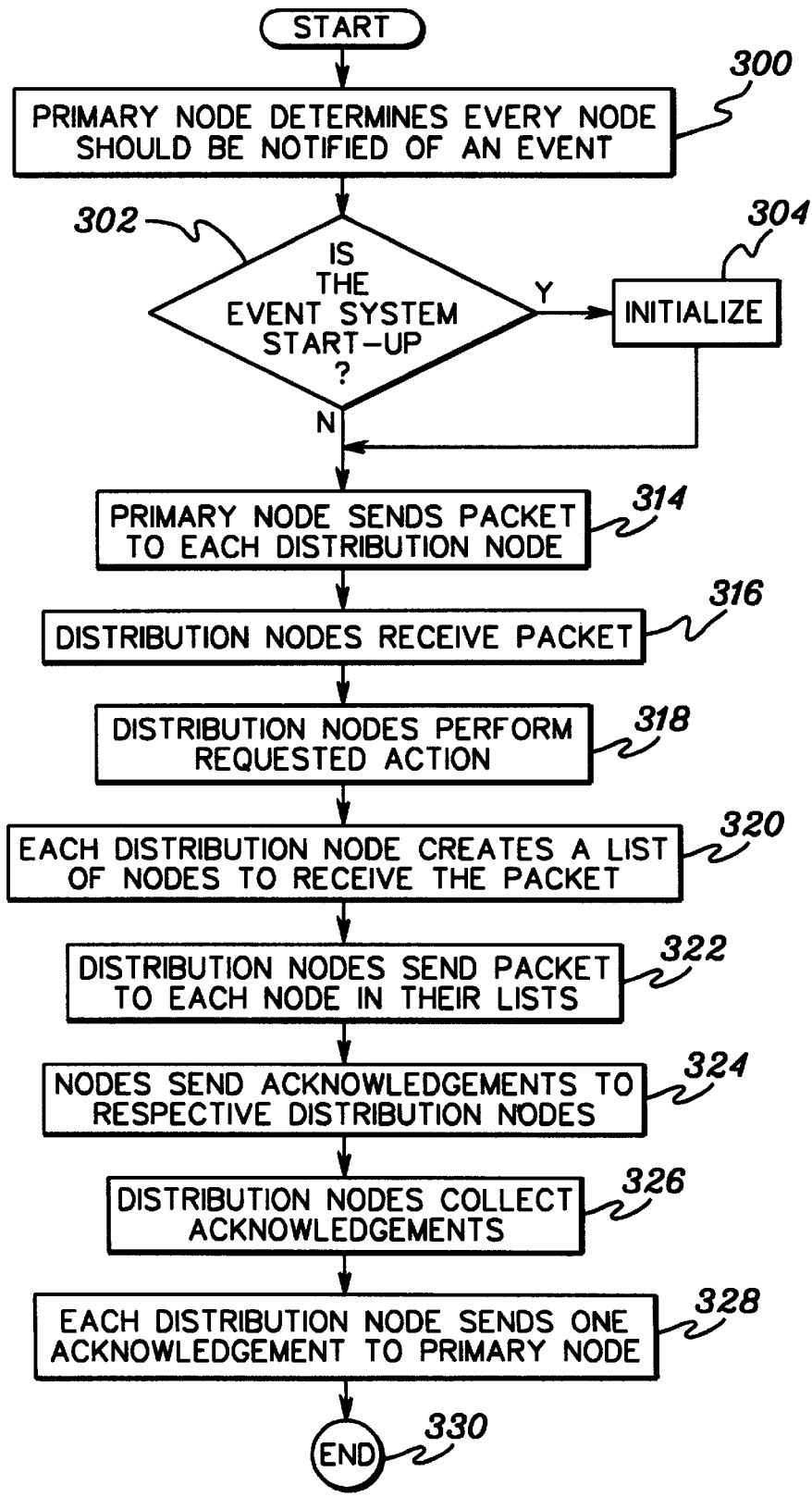
FIGS. 3a–3b depict one embodiment of the logic used to distribute messages within the computer system of FIG. 1, in accordance with the principles of the present invention.
Figure 3B:
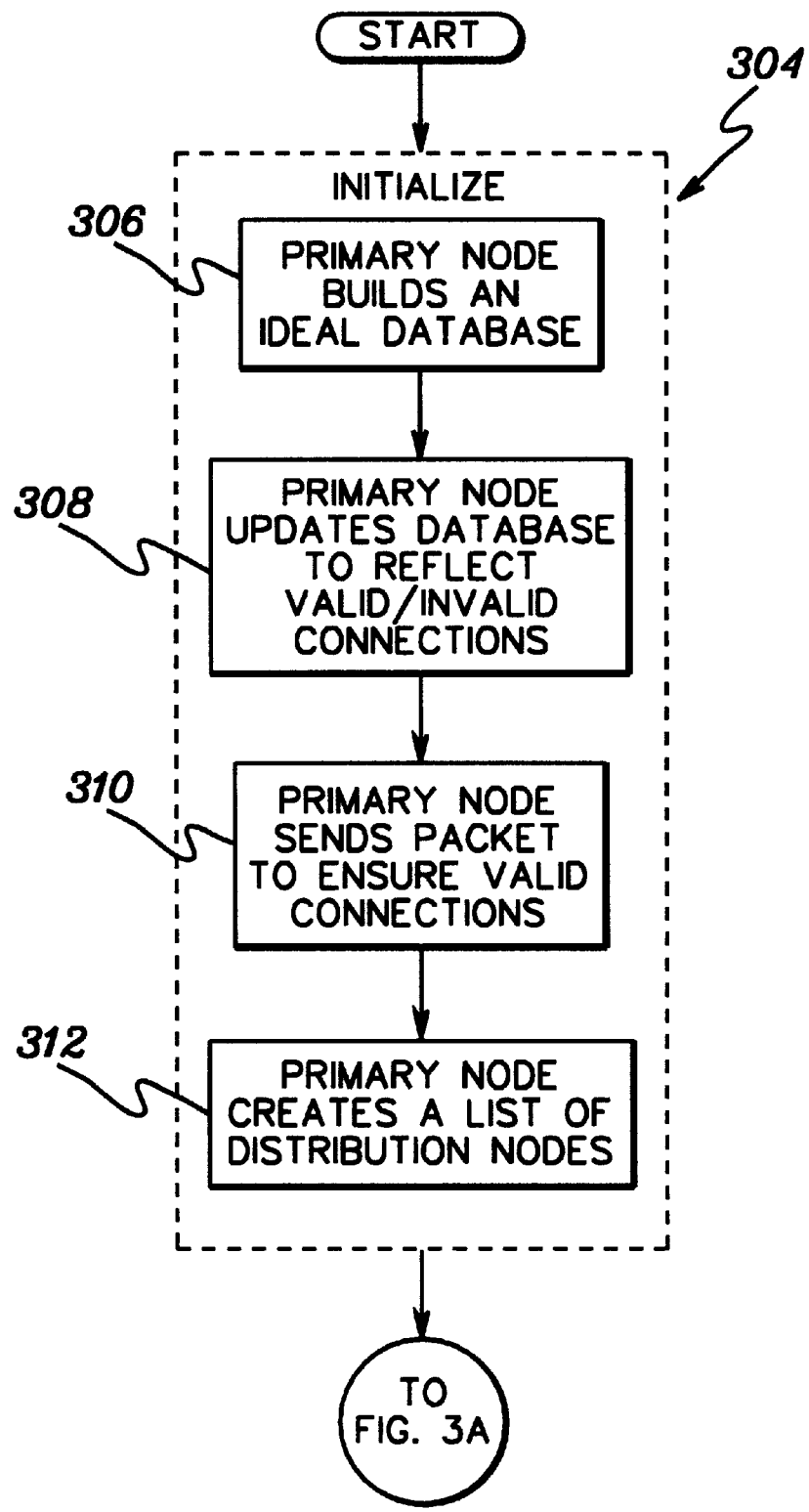

One embodiment for distributing messages in accordance with the principles of the present invention is described in detail with reference to FIGS. 3a–3b.

In one instance, the primary node receives notification of an event, which the primary node determines should be forwarded to all of the other nodes within the computer system, STEP 300. Examples of such an event include the starting of the system or a change in the network of the system.

If the event is starting of the system, INQUIRY 302, then some initial steps are taken by the primary node prior to distributing notification of the event, STEP 304. One example of the initial steps performed by the primary node is described with reference to FIG. 3b.

Initially, the primary node builds an ideal database of the nodes within the system, STEP 306. In particular, the primary node reads a topology file to determine which nodes are in the system and what are their connections, including which frame each node is located within. From this information, an ideal database is built, which assumes that all the nodes and connections are in working order.

Thereafter, the primary node explores the network, by any known means, to determine which of the nodes and connections are actually valid, and updates the ideal database to reflect this information, STEP 308. Then, to ensure all of the connections and nodes in the updated database are valid, the primary node sends a message (e.g., a read status packet) to each of the nodes indicated as valid and awaits an acknowledgement from each, STEP 310. If an acknowledgement is not returned from one or more of the nodes, then those nodes are indicated as invalid in the database. After all the acknowledgements are returned (or a certain amount of time has elapsed, so that it is assumed no more acknowledgements will be returned), the primary node knows the status of all of the nodes within the computer system.

Subsequent to determining the status of the nodes within the system, the primary node creates a list of distribution nodes to be used in the further forwarding of messages to the other nodes in the system (i.e., the valid nodes), STEP 312. In particular, the primary node scans the updated ideal database and selects a distribution node for each frame within the system. In one example, the node selected as the distribution node is the first node encountered in the database for a particular frame. In a first-in, first-out database, this is typically, but not necessarily, node 1, and in, for instance, a last-in, first-out database, this is typically, but not necessarily, node 16.

In the present example, the creation of the list of distribution nodes is described as an initialization step to be performed on system start-up. This is however, only one example. In another example, the primary node can create the list of distribution nodes each time the primary node is notified of an event that should be communicated to the other nodes of the system.

In accordance with the principles of the present invention, the selection of the distribution nodes is dynamic and adaptive. That is, the primary node selects the distribution nodes based on the active nodes within the system, thus, improving reliability of the message distribution. When the primary node knows that a particular node is not valid, it does not select that node as a distribution node.

Returning to FIG. 3a, after initialization is complete, or if the event is something other than start-up, such as a network change, INQUIRY 302, the primary node sends a message, by any known means, such as by a broadcast, to each of the distribution nodes on its list, STEP 314. The message can be of any type; however, as used in accordance with the principles of the present invention, the message is typically a service packet, which includes network control information. Examples of service packets include the following:

(A) A Broadcast Database Update service packet, which is used by the primary node to initiate a change to the network routing and destination structures. One example of this packet is shown below:

| Byte # | Description |
| --- | --- |
| 0 | 0xF9 |
| 1 | Reserved |
| 2 | Node Command (0x07) |
| 3 | Reserved (not used) |
| 4–7 | Source Node Identifier |
| 8–11 | Destination Node Identifier |
| 12–15 | Number of Updates |
| 16–255 | Updates to the Database |

In the examples herein, the source node identifier is the particular node sending the message (e.g., the primary node is the source when sending to the distribution nodes, and the distribution node is the source when sending the message to the particular nodes of its frame). The destination node is the node receiving the message. Additionally, the number of updates is the number of updates to the ideal database (a copy of which is at each node within the system), and the updates to the database include the particular updates to be made by each node.

(B) A Quiesce Sending service packet, which indicates to the receiver that it should now stop normal data traffic from flowing across the network. Data traffic is halted (quiesced) and later restarted (resumed), when normal data traffic would interfere with a network service operation. One example of this packet is shown below:

| Byte # | Description |
| --- | --- |
| 0 | 0x39 |
| 1 | Reserved |
| 2 | Node Command (0x04) |
| 3 | Reserved (not used) |
| 4–7 | Source Node Identifier |
| 8–11 | Destination Node Identifier |
| 12–15 | Reserved (not used) |

(C) A Resume Sending service packet, which indicates to the receiver that it should now allow normal data traffic to flow across the network. One example of this packet is shown below:

| Byte # | Description |
| --- | --- |
| 0 | 0x39 |
| 1 | Reserved |
| 2 | Node Command (0x05) |
| 3 | Reserved (not used) |
| 4–7 | Source Node Identifier |
| 8–11 | Destination Node Identifier |
| 12–15 | Reserved (not used) |

After the distribution nodes receive the service packet, STEP 316, each of the distribution nodes perform the action specified by the service packet, STEP 318. Additionally, each distribution node creates a list of the valid nodes in its frame that is to receive the service packet, STEP 320. The distribution node knows which nodes are valid by information received from the primary node (e.g., the updated ideal database). Thereafter, the service packet is sent, by, for example, a broadcast, from each distribution node to all of the nodes in its respective list, STEP 322.

After a node receives and processes the service packet, the node sends an acknowledgement back to its respective distribution node, STEP 324. In one embodiment, the acknowledgement is sent via an Acknowledgement packet, which is another service packet, indicating that a service request has been received and processed. One example of this packet is shown below:

| Byte # | Description |
| --- | --- |
| 0 | 0x39 |
| 1 | Reserved |
| 2 | Node Command (0x08) |
| 3 | Reserved (not used) |
| 4–7 | Source Node Identifier |
| 8–11 | Destination Node Identifier |
| 12 | Command Being Acknowledged |
| 13–15 | Reserved (not used) |

The distribution nodes wait and collect the acknowledgements from the nodes on their lists, STEP 326. As each distribution node receives all of its expected acknowledgements, it forwards one acknowledgement to the primary node indicating that all of its expected nodes have received and processed the request, STEP 328. An example of this acknowledgement is the Acknowledgement service packet described above.

When the primary node receives an acknowledgement from each of the distribution nodes, then the broadcast is complete, STEP 330. Should the primary node fail to receive an expected acknowledgement from a distribution node within a given length of time, the above-described process is repeated for a maximum of, for instance, four times. If after the maximum number of attempts, the primary node still does not receive the expected acknowledgements, then the initialization sequence is stopped.

Described above is a message distribution technique in which the primary node broadcasts a message to one or more distribution nodes within the system and then the distribution nodes are responsible for broadcasting that message to a plurality of other nodes. In one embodiment, the distribution node and the plurality of other nodes are located within one frame. The plurality of other nodes sends an acknowledgement back to its respective distribution node, which collects all of the acknowledgements. When each distribution node receives all of its expected acknowledgements, it sends one acknowledgement to the primary node, indicating that all of the nodes have received and processed the request. This technique insures reliable and verifiable distribution of messages.

In another embodiment of the invention, the distribution node can send back a number of acknowledgements to the primary node. The number of acknowledgements would be less than the number of acknowledgements received from its respective nodes, but it would still be an indication that all of the valid nodes of its frame have responded to the distribution node. Again, the technique of the present invention provides a reliable means for distributing messages.

The above embodiments are described with reference to acknowledgements. However, this is only one example. Other types of messages can be collected by the distribution nodes and forwarded to the primary node. For instance, messages relating to certain conditions, such as problem determination or system status, can be collected by the distribution nodes. Then, each distribution node can send one communication (or more communications as long as the number is less than the number of messages collected by the distribution node) to the primary node indicating a condition, which is specified by the messages collected by the distribution node. Thus, other types of messages are considered to be within the spirit of the claimed invention.

Depicted below is a table comparing an estimate of the time to distribute messages using a typical serial technique versus an estimate of the time to distribute messages using the present invention. In the serial technique, data is distributed throughout a network from a single point within the network. This technique is simple, but may become expensive in larger networks, as seen below:

| Number of Nodes | Number of Frames | Broadcast Tree Technique | Serial Technique |
|---|---|---|---|
| 16 | 1 | 360 | 360 |
| 32 | 2 | 620 | 520 |
| 64 | 4 | 650 | 840 |
| 128 | 8 | 690 | 1480 |
| 256 | 16 | 770 | 2760 |
| 512 | 32 | 930 | 5420 |
| 1024 | 64 | 1250 | 10440 |
| 2048 | 128 | 1890 | 20680 |

The time estimates shown in the column for the serial technique were computed as follows:

$$\text{Total Time} = (10 \times (N-1)) + S + P + A,$$

Where:
- N=Number of Nodes.
- D=Delay before initiating the packet sent to the last node, based on the number of nodes preceding it (i.e., 10×N−1).
- S=Time to transmit the service packet from one node to another (e.g., 80 milliseconds).
- P=Time to process the service packet at target node (e.g., 50 milliseconds).
- A=Time to transmit the acknowledgement service packet (e.g., 80 milliseconds).

As can be seen in the table, the serial technique is quicker when there are 16 or 32 nodes in the system. However, there is quite a difference in time, as the system grows.

For the broadcast tree technique of the present invention, the estimated times were computed as follows:

$$\text{Total Time} = (10 \times (F-1)) + S1 + P1 + D2 + S2 + P2 + A1 + P3 + A2,$$

Where:
- F=Number of Frames.
- N=Number of Nodes on a Frame (e.g., 16).
- D=Delay before initiating the packet sent to the last node, based on the number of nodes preceding it (i.e., 10×F−1).
- S=Time to transmit the service packet from one node to another (e.g., 80 milliseconds).
- P=Time to process the service packet at target node (e.g., 50 milliseconds).
- A=Time to transmit the Acknowledgement service packet (e.g., 80 milliseconds).
- D1=Delay at last frame.
- D2=Delay at last node on last frame.
- S1=Transmit time from Primary to Designated Node.
- S2=Transmit time from Designated Node to Last Node.
- P1=Processing time at Designated Node.
- P2=Processing time at Last Node.
- A1=ACK transmit time from Last Node.
- A2=ACK transmit time from Designated Node to Primary.

Thus, as it can be seen in very large systems, the message distribution technique of the present invention provides a significant time advantage in distributing messages to the nodes of a computer system.

The computer system described herein is only one example. Other systems and environments can be used with the present invention without departing from the spirit of the present invention. For example, a switch connection is not necessary, but offered as only one example. Other types of connections may be used without departing from the spirit of the present invention. Further, other types of nodes may be used or frames having more or less than 16 nodes can be used. Additionally, other changes to the system can be made without departing from the spirit of the present invention.

The present invention can be included in an article of manufacture (e.g., one or more computer program products) having, for instance, computer useable media. The media has embodied therein, for instance, computer readable program code means for providing and facilitating the capabilities of the present invention. The article of manufacture can be included as a part of a computer system or sold separately.

The flow diagrams depicted herein are just exemplary. There may be many variations to these diagrams or the steps (or operations) described therein without departing from the spirit of the invention. For instance, the steps may be performed in a differing order, or steps may be added, deleted or modified. All of these variations are considered a part of the claimed invention.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A message distribution method for a computer system, comprising:

determining, by a primary node of said computer system, a valid distribution node of said computer system, said determining comprising selecting, by said primary node, said valid distribution node from a list of active nodes of said computer system;

sending, by said primary node, a message to said valid distribution node, said message comprising, at least in part, information contained in a list of active nodes;

sending said message from said valid distribution node to a plurality of nodes of said computer system;

collecting, by said valid distribution node, indications of receipt of said message from said plurality of nodes; and forwarding one acknowledgement from said valid distribution node to said primary node, said one acknowledgement indicating receipt of the message by said plurality of nodes.

2. The method of claim 1, wherein said determining by said primary node further comprises determining another valid distribution node wherein said sending by said primary node further comprises sending said message in parallel to said another valid distribution node, and wherein said another valid distribution node sends said message to one or more additional nodes of said computer system, said another valid distribution node collects indications of receipt of said message from said one or more additional nodes, and said another valid distribution node forwards an acknowledgement to said primary node, said acknowledgement indicating receipt of the message by said one or more additional nodes.

3. The method of claim 2, wherein said sending by said primary node comprises a broadcast function.

4. The method of claim 1, wherein said sending by said valid distribution node comprises a broadcast function.

5. The method of claim 1, wherein said valid distribution node and said plurality of nodes are located in one frame of said computer system.

6. The method of claim 1, wherein said message comprises system control information.

7. The method of claim 6, wherein said system control information comprises at least one of:
  (a) point to point route updates;
  (b) one or more additions to system destinations;
  (c) one or more deletions to system destinations;
  (d) a quiesce of system data traffic for system maintenance; and
  (e) a resume of system data traffic after a quiesce.

8. The method of claim 1, wherein said forwarding comprises forwarding a number of acknowledgements from said valid distribution node to said primary node, said number of acknowledgements being less than the number of indications received by said valid distribution node from said plurality of nodes, and wherein said number of acknowledgements indicates receipt of the message by said plurality of nodes.

9. The method of claim 1, wherein said list of active nodes is maintained only by said primary node.

10. The method of claim 1, wherein said plurality of nodes is identified in said list of active nodes.

11. A message distribution method for a computer system, comprising:

determining, by a primary node of said computer system, a valid distribution node of said computer system, said determining comprising selecting, by said primary node, said valid distribution node from a list of active nodes of said computer system;

sending, by said primary node, a message to said valid distribution node, said message comprising, at least in part, information contained in a list of active nodes;

sending said message from said valid distribution node to a plurality of nodes of said computer system;

collecting, by said valid distribution node, messages from said plurality of nodes, said messages corresponding to the message received from said valid distribution node; and forwarding one communication from said valid distribution node to said primary node, said one communication indicating a condition specified by the messages of said plurality of nodes collected by said valid distribution node.

12. The method of claim 11, wherein said forwarding comprises forwarding a number of communications from said valid distribution node to said primary node, said number of communications being less than the number of messages received by said valid distribution node from said plurality of nodes, and wherein said number of communications indicates said condition specified by the messages of said plurality of nodes.

13. The method of claim 11, wherein said list of active nodes is maintained only by said primary node.

14. The method of claim 11, wherein said plurality of nodes is identified in said list of active nodes.

15. An article of manufacture comprising:

a computer useable medium having computer readable program code means embodied therein for use in distributing messages, the computer readable program code means in said article of manufacture comprising:

computer readable program code means for causing a computer to effect determining, by a primary node of said computer system, a valid distribution node of said computer system;

computer readable program code means for causing a computer to effect selecting, by said primary node, said valid distribution node from a list of active nodes of said computer system;

computer readable program code means for causing a computer to effect sending, by said primary node, a message to said valid distribution node, said message comprising, at least in part, information contained in a list of active nodes;

computer readable program code means for causing a computer to effect sending said message from said valid distribution node to a plurality of nodes of said computer system;

computer readable program code means for causing a computer to effect collecting, by said valid distribution node, indications of receipt of said message from said plurality of nodes; and computer readable program code means for causing a computer to effect forwarding one acknowledgement from said valid distribution node to said primary node, said one acknowledgement indicating receipt of the message by said plurality of nodes.

16. The article of manufacture of claim 15, wherein said computer readable program code means for causing a computer to effect determining by said primary node further comprises computer readable program code means for causing a computer to effect determining another valid distribution node of said computer system, sending, by said another valid distribution node, said message to one or more additional nodes of said computer system, collecting by said another valid distribution node indications of receipt of said message from said one or more additional nodes, and forwarding by said another distribution node an acknowledgement to said primary node, said acknowledgement indicating receipt of the message by said one or more additional nodes.

17. The article of manufacture of claim 15, wherein said computer readable program code means for causing a computer to effect sending by said primary node further comprises computer readable program code means for causing a computer to effect using a broadcast function to send said message.

18. The article of manufacture of claim 15, wherein said computer readable program code means for causing a computer to effect sending by said valid distribution node further comprises computer readable program code means for causing a computer to effect using a broadcast function to send said message.

19. The article of manufacture of claim 15, wherein said computer readable program code means for causing a computer to effect forwarding comprises computer readable program code means for causing a computer to effect forwarding a number of acknowledgements from said valid distribution node to said primary node, said number of acknowledgements being less than the number of indications received by said valid distribution node from said plurality of nodes, and wherein said number of acknowledgements indicates receipt of the message by said plurality of nodes.

20. The computer readable program code means in said article of manufacture of claim 15, further comprising computer readable program code means for causing a computer to effect maintaining, by only said primary node, said list of active nodes.

21. The computer readable program code means in said article of manufacture of claim 15, wherein said plurality of nodes is identified in said list of active nodes.

22. An article of manufacture comprising:
   a computer useable medium having computer readable program code means embodied therein for use in distributing messages, the computer readable program code means in said article of manufacture comprising:
   computer readable program code means for causing a computer to effect determining, by a primary node of said computer system, a valid distribution node of said computer system;
   computer readable program code means for causing a computer to effect selecting, by said primary node, said valid distribution node from a list of active nodes of said computer system;
   computer readable program code means for causing a computer to effect sending, by said primary node, a message to said valid distribution node, said message comprising, at least in part, information contained in a list of active nodes;
   computer readable program code means for causing a computer to effect sending said message from said valid distribution node to a plurality of nodes of said computer system;
   computer readable program code means for causing a computer to effect collecting, by said valid distribution node, messages from said plurality of nodes, said messages corresponding to the message received from said valid distribution node; and
   computer readable program code means for causing a computer to effect forwarding one communication from said valid distribution node to said primary node, said one communication indicating a condition specified by the messages of said plurality of nodes collected by said valid distribution node.

23. The article of manufacture of claim 22, wherein said computer readable program code means for causing a computer to effect forwarding comprises computer readable program code means for causing a computer to effect forwarding a number of communications from said valid distribution node to said primary node, said number of communications being less than the number of messages received by said valid distribution node from said plurality of nodes, and wherein said number of communications indicates said condition specified by the messages of said plurality of nodes.

24. The computer readable program code means in said article of manufacture of claim 22, further comprising computer readable program code means for causing a computer to effect maintaining, by only said primary node, said list of active nodes.

25. The computer readable program code means in said article of manufacture of claim 22, wherein said plurality of nodes is identified in said list of active nodes.

26. A message distribution system, comprising:
   a primary node of a computer system adapted to determine a valid distribution node of said computer system by selecting from a list of active nodes in said computer system;
   said primary node further adapted to send a message to said valid distribution node, said message comprising, at least in part, information contained in said list of active nodes;
   said valid distribution node adapted to send said message to a plurality of nodes of said computer system;
   said valid distribution node further adapted to collect indications of receipt of said message from said plurality of nodes; and
   said valid distribution node further adapted to forward one acknowledgment to said primary node, said one acknowledgment indicating receipt of said message by said plurality of nodes.

27. The message distribution system of claim 26, further comprising:
   said primary node further adapted to determine another valid distribution node and to send said message in parallel to said another valid distribution node;
   said another valid distribution node adapted to send said message to one or more additional nodes of said computer system;
   said another valid distribution node further adapted to collect indications of receipt of said message from said one or more additional nodes;
   said another valid distribution node further adapted to forward an acknowledgment to said primary node indicating receipt of said message by said one or more additional nodes.

28. The message distribution system of claim 27, wherein said primary node is further adapted to send said message to said valid distribution node and said another valid distribution node by broadcasting.

29. The message distribution system of claim 26, wherein said valid distribution node is further adapted to send said message to said plurality of nodes by broadcasting.

30. The message distribution system of claim 26, wherein said valid distribution node and said plurality of nodes are located in one frame of said computer system.

31. The message distribution system of claim 26, wherein said message comprises system control information.

32. The message distribution system of claim 31, wherein said system control information comprises at least one of:
   (a) point to point route updates;
   (b) one or more additions to system destinations;

(c) one or more deletions to system destinations;

(d) a quiesce of system data traffic for system maintenance; and (e) a resume of system data traffic after a quiesce.

33. The message distribution system of claim 26, wherein said valid distribution node is further adapted to forward a number of acknowledgments to said primary node, said number of acknowledgments indicating receipt of said message by said plurality of nodes and being less than said indications received by said valid distribution node from said plurality of nodes.

34. The message distribution system of claim 26, said primary node further adapted to maintain said list of active nodes.

35. The message distribution system of claim 26, wherein said list of active nodes comprises said plurality of nodes.

* * * * *